United States Patent [19]

Kitamura

[11] Patent Number: 4,541,378
[45] Date of Patent: Sep. 17, 1985

[54] THROTTLE CONTROL DEVICE FOR INTERNAL COMBUSTION ENGINE

[75] Inventor: Sunao Kitamura, Nagoya, Japan

[73] Assignee: Aisan Kogyo Kabushiki Kaisha, Obu, Japan

[21] Appl. No.: 621,183

[22] Filed: Jun. 15, 1984

[30] Foreign Application Priority Data

Sep. 12, 1983 [JP] Japan .......................... 58-141762[U]

[51] Int. Cl.⁴ ............................................. F02M 1/14
[52] U.S. Cl. .................................. 123/333; 123/339; 123/399
[58] Field of Search ............... 123/396, 399, 401, 389, 123/339, 332, 333, 361

[56] References Cited

U.S. PATENT DOCUMENTS 4,398,514 8/1983 Nakamura ........................... 123/339
4,474,155 10/1984 Sagnes .................................. 123/333

Primary Examiner—William A. Cuchlinski, Jr.
Attorney, Agent, or Firm—Dennison, Meserole, Pollack & Scheiner

[57] ABSTRACT

A throttle control device for an internal combustion engine comprising an acceleration sensor for generating an output signal corresponding to the amount of depression of an accelerator pedal, a vacuum sensor for varying an output in response to change in negative pressure in an air intake passage between in a fully closed position of a throttle valve upon release of the accelerator pedal and in an open position of the throttle valve upon depression of the accelerator pedal, a throttle valve driving motor for driving the throttle valve against a biasing force of a back spring normally biasing the throttle valve in its fully closing direction, and an electric control circuit for receiving output signals from the acceleration sensor and the vacuum sensor and the vacuum sensor to control the throttle valve driving motor in response to the output signal from the acceleration sensor, and acting to cut off current to the throttle valve driving motor when the output signal from the vacuum sensor upon release of the accelerator pedal is an output corresponding to an open position of the throttle valve. With this arrangement, the throttle valve may be easily and quickly returned to its fully closed position, i.e., to engine idling condition with the aid of biasing force of the back spring by cutting off current to the throttle valve driving motor, in the case that negative pressure in the air intake passage under such a condition that the accelerator pedal is undepressed does not reach a predetermined value of negative pressure corresponding to the fully closed position of the throttle valve, and the throttle control condition is decided as being abnormal.

2 Claims, 7 Drawing Figures

THROTTLE CONTROL DEVICE FOR INTERNAL COMBUSTION ENGINE

BACKGROUND OF THE INVENTION

This invention relates to a throttle control device for electrically controlling the amount of intake air to an internal combustion engine.

Conventionally, as shown in FIG. 1, operation of the accelerator pedal 1 is transmitted through the throttle cable 2 or a link mechanism (not shown) to the throttle lever 3, and the throttle valve connected to the throttle lever 3 is directly mechanically controlled. During such operation, the operator tends to depress the accelerator pedal 1 more than he needs without taking notice of optimum acceleration of the engine, thereby adversely affecting exhaust gas and fuel consumption, and rendering optimum operation of the engine difficult.

In order to cope with the above problems, it is known in the art that opening and closing operation of the throttle valve is controlled by a motor, wherein the amount of depression of the accelerator pedal is converted to an electric signal by a potentio meter which is in turn inputted to an electric control circuit. The motor is driven by an output signal from the electric control circuit to properly control the throttle valve in response to the amount of depression of the accelerator pedal and the operational characteristic of the engine. In the case that abnormality is apparent in the throttle valve driving motor or the electric control circuit, it has been essential to employ a safety device effective to release the open position of the throttle valve for purposes of ensuring a safety drive.

Such a safety device includes an electromagnetic clutch disposed between a throttle shaft serving as a rotary shaft of a throttle valve and an output shaft of a throttle valve driving motor. In the event that abnormal condition is apparent, current to the electromagnetic clutch is cut off to separate the throttle shaft from the output shaft of the throttle valve driving motor, so that the throttle valve may not be driven by the motor. However, as this safety device employs the electromagnetic clutch, it requires a relatively large throttle control device, and yet an extra control circuit for controlling the electromagnetic clutch. As a result, the number of parts to be used is increased, thereby reducing reliability of the throttle valve control system as well as of the electromagnetic clutch because of such increase in the number of parts to be used. For these reasons, safety drive is not ensured by the prior art safety device as mentioned above.

SUMMARY OF THE INVENTION

Accordingly, it is an object of the present invention to provide a throttle control device for an internal combustion engine which may easily and quickly return the throttle valve to its fully closed position, i.e., to engine idling condition with the aid of a biasing force of the back spring by cutting off current to the throttle valve driving motor, when negative pressure in the air intake passage with the accelerator pedal released does not reach a predetermined value of negative pressure, corresponding to the fully closed position of the throttle valve, and the throttle control condition is decided as being abnormal.

The throttle control device for an internal combustion engine according to the present invention comprises, as shown in FIG. 2, an acceleration sensor 12 for generating an output signal corresponding to the amount of depression of an accelerator pedal 11, a vacuum sensor 14 for varying an output in response to change in negative pressure in an air intake passage between in the fully closed position of a throttle valve 13 upon release of the accelerator pedal 11 and in the open position of the throttle valve 13 upon depression of the accelerator pedal 11, a throttle valve driving motor 16 for driving the throttle valve 13 against a biasing force of a back spring 15 normally biasing the throttle valve in its fully closing direction, and an electric control circuit 17 for receiving output signals from the acceleration sensor 12 and the vacuum sensor 14 to control the throttle valve driving motor 16 in response to the output signal from the acceleration sensor 12, and acting to cut off current to the throttle valve driving motor 16 when the output signal from the vacuum sensor 14 upon release of the accelerator pedal 11 is an output corresponding to an open position of the throttle valve 13.

The other objects and advantageous features of the invention will become more clear from the following description of the preferred embodiments taken in conjunction with the accompanying drawings.

DETAILED DESCRIPTION OF THE PREFERRED EMBODIMENT

Figure 1:
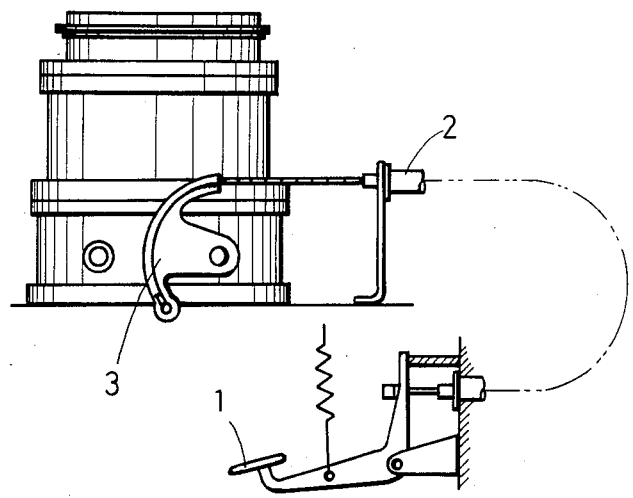
FIG. 1 is a schematic view of a throttle control device in the prior art.
Figure 2:
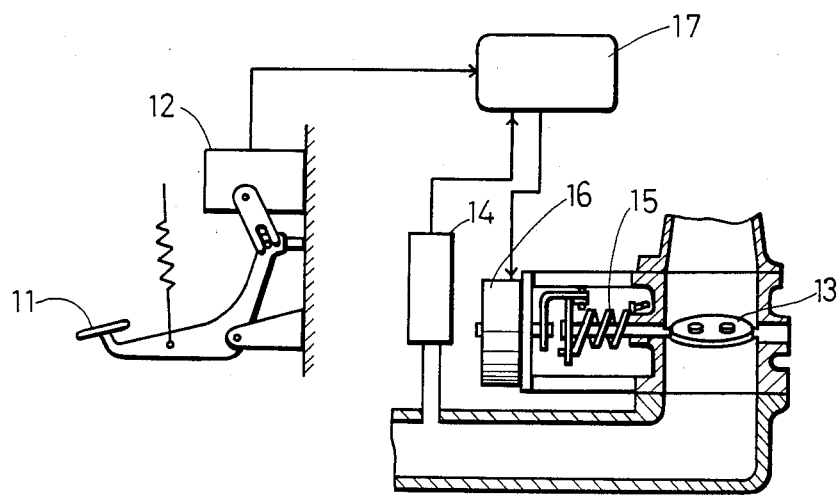
FIG. 2 is a general schematic view of a throttle control device according to the present invention.
Figure 3:
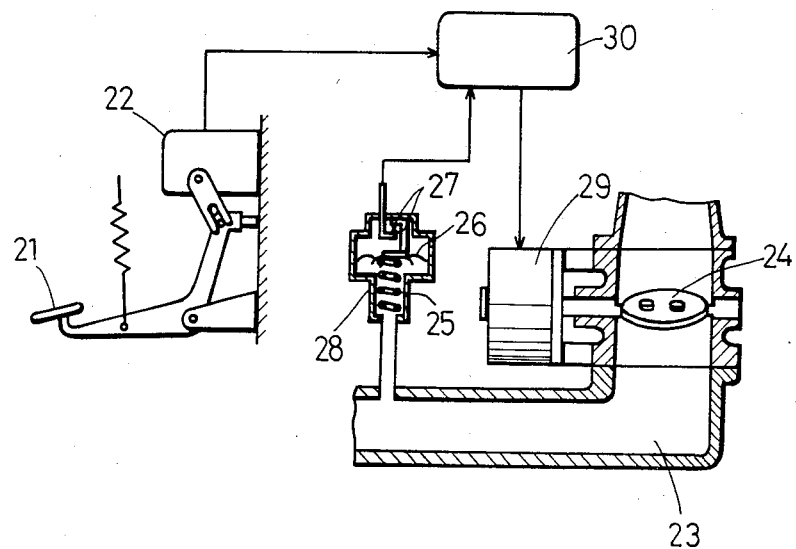
FIG. 3 is a schematic view of a throttle control device of an embodiment according to the present invention.

Referring now to FIG. 3 which shows an embodiment of the present invention, an accelerator sensor 22 such as a potentiometer generates an output signal corresponding to the amount of depression of an accelerator pedal 21. A vacuum switch 28 is operatively connected to an air intake pipe for activation through vacuum created in the intake pipe when the accelerator pedal 21 is in its released position to fully close a throttle valve 24, a diaphragm 26 is displaced against a biasing force of a coil spring 25 by decrease in an intake monifold vacuum to switch on a contact point 27. Conversely, when the accelerator pedal 21 is depressed to open the throttle valve 24, the coil spring 25 is returned by increase in an intake manifold vacuum to switch off the contact point 27. An electric control circuit 30 receives an output signal from the acceleration sensor 22 and an output signal from the vacuum switch 28. The electric control circuit 30 normally feeds a pulse current to a step motor 29. In the case that a comparative data between the output signal from the acceleration sensor 22 and that from the vacuum switch 28 is different from a preset data of a microcomputer incorporated in the electric control circuit 30, the electric control circuit 30 decides the engine condition as being abnormal, and instantaneously cuts off the pulse current to the step motor 29.

Figure 4:
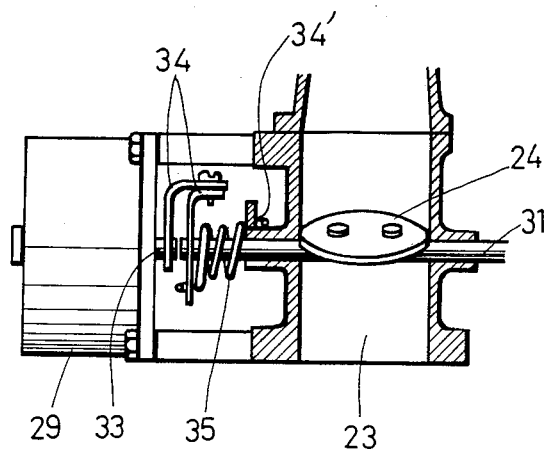
FIG. 4 is a detailed illustration in cross section of the essential part of FIG. 3.

Referring next to FIG. 4, the throttle valve 24 is fixed to a throttle shaft 31, and serves to control the effective sectional area of an air intake passage 23 by the rotation of the throttle shaft 31 to adjust the amount of intake air. A variable reluctance type step motor is employed for the step motor 29, and an output shaft 33 of the step motor 29 is connected through connecting levers 34 to the throttle shaft 31 for simultaneous rotation. A back spring 35 biasing the throttle valve 24 in its closing direction is connected at its one end to one of the connecting levers 34 on the throttle shaft 31 side, and is connected at its other end to a fixed member 34' formed on the air intake pipe. When current to the step motor 29 is cut off, the throttle valve 24 is readily rotated in its fully closing direction through the back spring 35 by the variable reluctance type step motor 29, because the step motor 29 has a small torque for stopping the rotation of the rotor upon cut-off of the current.

Figure 5:
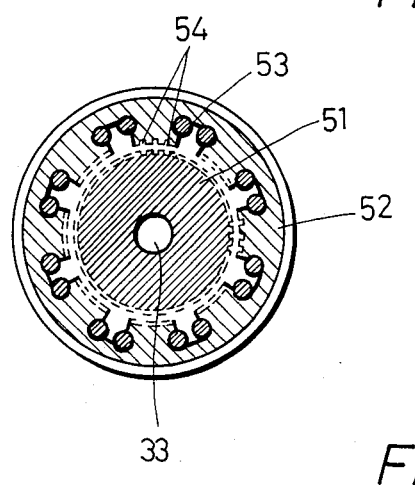
FIG. 5 is a cross sectional view of the step motor of a variable reluctance type in FIG. 4.

As shown in FIG. 5, the variable reluctance type step motor 29 comprises a rotor 51, a stator 52 and a winding 53. The rotor 51 and the stator 52 are provided with multiple projected pole portions 54 at its outer and inner circumferences, respectively without employing a permanent magnet therefor. It should be noted that the torque for stopping the rotation of the output shaft of the rotor 51 is remarkably small where no driving current is fed to the step motor 29.

Figure 6:
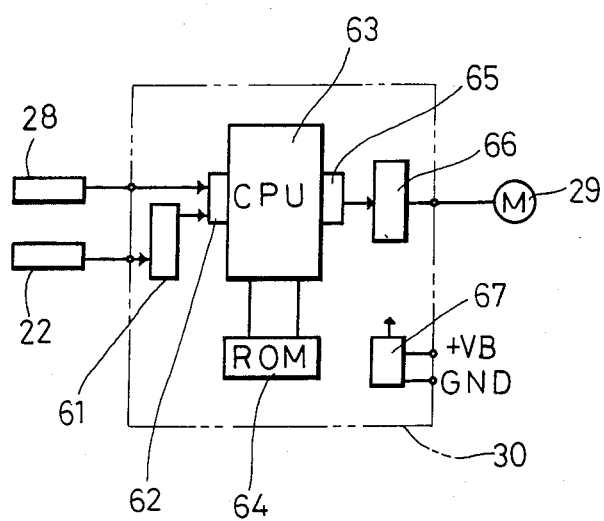
FIG. 6 is a block diagram of the electric control circuit of the embodiment according to the present invention.

Referring to FIG. 6, an output signal from the acceleration sensor 22 is inputted to an A/D converter 61 in the electric control circuit 30, where it is converted to a digital signal, and then is inputted through an I/O port 62 to a microcomputer CPU 63. On the other hand, an output signal from the vacuum sensor 28 is inputted through the I/O port 62 to the microcomputer 63. A memory circuit ROM 64 stores a control program, for example a pulse current data to be supplied to the step motor 29 in response to the output signal from the acceleration sensor 22. ROM 64 also stores a self-diagnostic program for deciding whether function of the control system is under a normal or an abnormal condition according to the output signals from the acceleration sensor 22 and the vacuum switch 28. When CPU 63 decides the abnormal condition according to execution of the self-diagnostic program, it cuts off current to the step motor 29. Under the normal condition, CPU 63 outputs a digital signal through an I/O port 65 to a motor driving circuit 66 to feed the pulse current from the motor driving circuit 66 to the step motor 29. Reference numeral 30 designates a power source circuit of the electric control circuit 30.

In operation, as best seen in FIG. 3, when the accelerator pedal 21 is depressed by an operator, an electric signal corresponding to the amount of depression of the pedal 21 is fed from the acceleration sensor 22 connected with the accelerator pedal 21 to the electric control circuit 30 incorporating the microcomputer 63. Such an input signal is converted to a digital signal by the A/D converter 61 as shown in FIG. 6, and the digital signal is inputted through the I/O port 62 to the microcomputer 63. The signal from the acceleration sensor 22 into the microcomputer 63 is processed by the programs in the microcomputer 63 and the memory circuit ROM 64, and then an opening degree of the throttle valve 24 is determined. The microcomputer 63 outputs a motor driving digital signal through the I/O port 65 to the motor driving circuit 66 so that a predetermined opening degree of the throttle valve 24 may be reached. The digital signal is converted to a pulse current by the motor driving circuit 66, and is fed to the step motor 29. The pulse current is sequentially fed to the windings 53 of each phase as shown in FIG. 5, thereby exciting the phases. The step motor 29 is steppedly rotated by attraction of the projected pole portions 54 of the rotor 51 and the stator 52 in the excited phase to thereby generate a rotational torque on the output shaft 33. The rotational torque is transmitted through the connecting lever 34 as shown in FIG. 4 to the throttle shaft 31, and accordingly the throttle valve 24 is rotated to the predetermined opening degree against the biasing force of the back spring 35. In the case that the throttle valve 24 is intended to be retained at a fixed opening degree, the pulse current is fed to a certain phase of the step motor 29. In the case that the throttle valve 24 is controlled to various opening degrees, the pulse current is fed to each of the phases.

Under the normal operational condition of the internal combustion engine, when the accelerator pedal 21 is returned from its depressed position to the released position to fully close the throttle valve 24, the throttle valve 24 is returned to the initial condition of the throttle control device of the internal combustion engine, i.e., to the fully closed position of the throttle valve responsive to release of the accelerator pedal 21, by controlling the throttle valve driving motor 29 through the electric control circuit 30. At the same time, negative pressure in the air intake passage 23 is increased, and the vacuum switch 28 is closed. On the other hand, under such abnormal condition where the throttle valve is returned to its fully closed position even when the accelerator pedal 21 is released, the microcomputer 63 decides that the operation of the throttle control device of the engine is abnormal according to the off position of the vacuum switch 28, and instantanously stops supplying power to the step motor 29. Accordingly, the throttle valve 24 is returned to its fully closed position by the biasing force of the back spring 35.

Figure 7:
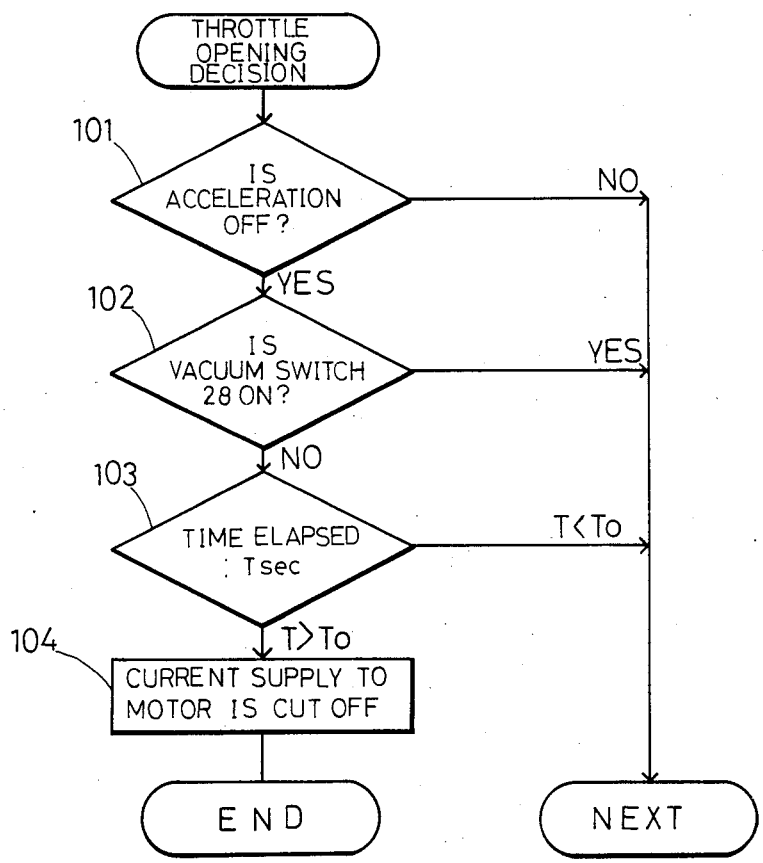
FIG. 7 is a flow chart showing the steps from deciding abnormality of the throttle control device to cutting off current to the step motor.

The above operation will be described below by using the flow chart as shown in FIG. 7.

In a throttle opening decision routine, as shown in FIG. 7, it is decided in a step 101 whether or not the accelerator pedal 21 is released to reach acceleration off. It is decided in a step 102 whether or not the vacuum switch 28 is on. If the vacuum switch 28 is on, the effective sectional area at the throttle valve 24 in the air intake passage 23 is reduced to increase the negative pressure in the air intake passage 23 under the normal condition. If the vacuum switch 28 is off under the abnormal condition, the system is advanced to a step 103, and if the duration time T sec of the abnormal condition exceeds a predetermined time $T_0$, for example 10 to 20 seconds by a microcomputer control progam stored in the electric control circuit 30, it is decided in a step 103 that the abnormal condition is a condition where the throttle valve 24 remains open, resulting from other factor than a throttle valve control based on the operation of the accelerator pedal 21, and current supply to the step motor 29 is cut off in a step 104. Accordingly, excitation of the phase in the step motor 29 is released to reduce the rotation generating torque of the output shaft to zero. Further, since the step motor 29 is of a variable reluctance type having no permanent magnet therein, the rotation stopping torque of the output shaft is greatly small while the step motor is not excited, and as a result, the throttle valve 24 may be returned to its fully closed position instantaneously in response to the return force of the back spring 35.

As is above described, according to the first embodiment of the present invention, each signal from the acceleration sensor 22 and the vacuum switch 28 is processed by the microcomputer incorporating the electric control curcuit 30, and the microcomputer decides whether the operation of the throttle control device of the internal combustion engine is in the normal or abnormal condition. Under such a circumstance, if the operation is in the abnormal condition, current to the step motor 29 is cut off to return the throttle valve 24 to its fully closed position by the return force of the back spring 35.

In a second embodiment, the signal outputted from the acceleration sensor 22 in response to the amount of depression of the accelerator pedal 21 and a driving step number signal from the step motor 29 corresponding to the signal from the acceleration sensor are compared with each other and operated by the microcomputer incorporating the electric control circuit 30. If the result of operation of the microcomputer is different from a program set value, the microcomputer determines the operating condition as being abnormal. As a result, current from the step motor 29 is cut off to return the throttle valve 24 to its fully closed position by the return force of the back spring 35.

Although some preferred embodiments of the invention have been disclosed and described, it is apparent that other embodiments and mofifications of the invention are possible within the scope of the appended claims.

What is claimed is:

1. A throttle control device for an internal combustion engine comprising:
    (a) an acceleration sensor including means for generating an output signal corresponding to the amount of depression of an accelerator pedal;
    (b) a vacuum sensor including means for varying an output signal in response to change in negative pressure in an air intake passage between a fully closed position of a throttle valve upon release of the accelerator pedal and an open position of a throttle valve upon depression of the accelerator pedal;
    (c) an electric control circuit including means for receiving the output signals of said acceleration sensor and said vacuum sensor, said electric control circuit including means for generating a control signal in response to said output signals;
    (d) a throttle valve driving motor including means for operating in response to said control signal to drive a throttle valve against the biasing force of a back spring normally biasing the throttle valve in a closed direction, whereby the throttle valve is moved to an open position upon depression of the accelerator pedal;
    wherein said control circuit further includes means to cut off power to said driving motor when the output signal from the vacuum sensor corresponds to an open position of the throttle valve and the output signal from the acceleration sensor corresponds to release of the accelerator pedal.

2. The throttle control device as defined in claim 1, wherein said throttle valve driving motor is a step motor of a variable reluctance type.

* * * * *